United States Patent [19]

Monick

[11] Patent Number: 4,620,618
[45] Date of Patent: Nov. 4, 1986

[54] BRAKE SHOE ADJUSTER

[75] Inventor: Frederick R. Monick, Chicago, Ill.

[73] Assignee: Eaton Corporation, Cleveland, Ohio

[21] Appl. No.: 723,027

[22] Filed: Apr. 15, 1985

[51] Int. Cl.$^4$ ............................................. F16D 65/56
[52] U.S. Cl. ........................ 188/196 BA; 188/79.5 K
[58] Field of Search ............... 188/71.9, 72.7, 79.5 K, 188/79.5 BE, 196 BA

[56] References Cited

U.S. PATENT DOCUMENTS

| | | | |
|---|---|---|---|
| 3,351,163 | 11/1967 | Sander et al. .................. | 188/79.5 K |
| 3,392,810 | 7/1968 | Svensson .................... | 188/79.5 K X |
| 4,440,268 | 4/1984 | Karlsson ....................... | 188/79.5 K |

Primary Examiner—Duane A. Reger
Attorney, Agent, or Firm—C. H. Grace; A. E. Chrow

[57] ABSTRACT

Disclosed is an automatic slack adjuster (50) for maintaining a substantially constant clearance (C) between a braking member and a rotatable braking surface in a brake released condition between a braking member (8) having a frictional layer (1) and a rotatable braking surface (12) of the type including an elongate power screw (2) having threads (4) threadingly engaged with threads of a rotatable nut member (6). Clearance (C) is maintained upon application of the brake by an operator by means of an adjustment member (16) that is preferably in splined engaged relationship with nut member (18) and causes nut member (6) to rotate and advance braking member (8) in a clearance correcting direction upon application of the brake of an operator by means of a drive train driven by power screw (2) preferably comprising a first drive means (20) integral with power screw (2), rack means (22), second drive means (24) and third drive means (34) operably engaged with adjustment member (16). Adjuster (50) is further provided with clutch means (26) adapted to stop upon engagement between frictional liner (10) and braking surface (12) and rotational directional control means preferably in the form of one-way ratchet assembly (38) adapted to prevent nut member (6) from backing off upon release of the brake by the operator.

10 Claims, 2 Drawing Figures

4,620,618

BRAKE SHOE ADJUSTER

INTRODUCTION

This invention relates generally to an automatic slack adjuster for maintaining a substantially constant clearance between a braking member and a rotatable braking surface such as a vehicular wheel disc and more particularly for use with brake assemblies of the type including a power screw that is rotated in opposite directions upon respective application and release of the brake by the operator.

BACKGROUND OF THE INVENTION

Brake assemblies particularly adapted for vehicular brakes that use a power screw that is rotated in opposite directions to correspondly move a brake member towards and away from a rotatable braking surface upon respective application and release of the brake by an operator have been known for many years.

Examples of braking assemblies utilizing such power screws are respectively disclosed in U.S. Pat. Nos. 3,765,515; 3,835,961; 3,942,827; 4,122,300; 3,976,168; 4,014,411; 4,036,330; 4,319,669; 4,355,708; and 4,406,352, the disclosures of all of which are included herein by reference.

Generally, the power screw is actuated in some manner by respective application and release of the brake by an operator and is threadingly engaged with a nut member disposed coaxially thereabout that is adapted to move the braking member in opposite brake applying and brake releasing directions in response to opposite axial movement thereof along the power screw.

The braking member generally includes a layer of frictional material that is urged against the rotatable braking surface upon application of the brake and typically becomes worn over a period of time resulting in increased clearance between the braking member and the braking surface in the brake released condition. In order to compensate for such wear, a variety of automatic slack adjusters have been developed over the years such as disclosed in the above referenced patents to maintain as best as possible a substantially constant clearance between the braking member and the braking surface in the brake released condition to minimize slack.

Automatic slack adjusters for use with power screws generally involve some means of automatically rotating the nut member an angular amount required to advance the nut member axially along the screw any clearance correcting distance required to maintain an initial desired clearance between the braking member and the braking surface in a brake released condition upon application of the brake by the operator. Understandably, such adjusters must be accurate and simple to operate and maintain. However, automatic slack adjuster must also be provided with means for preventing back-off of the nut member upon release of the brake by an operator as well as some means of preventing continued rotation of the nut member once the braking member becomes engaged with the braking surface. It is to the totality of providing an accurate and easily maintained automatic slack adjusting system coupled with means for preventing back-off of the nut member as well as preventing continued rotation thereof upon engagement between the braking member and braking surface to which this invention is addressed.

SUMMARY OF THE INVENTION

Accordingly, it is an object of this invention to provide an automatic brake slack adjuster for maintaining a substantially constant clearance between a braking member and a braking surface in a brake released condition of a brake assembly of the type including a power screw for its operation.

It is another object of this invention to provide an automatic slack adjuster for use with a brake assembly of the type including a power screw that is accurate and easily maintained.

It is a further object of this invention to provide an automatic slack adjuster for use with a brake assembly of the type including a power screw threadingly engaged with a nut member that is accurate and easily maintained as well as being adapted to prevent back-off of the nut member upon release of the brake in addition to being prevented from continuing rotation in a brake applying direction upon engagement between the braking member and the braking surface.

DESCRIPTION OF SOME PREFERRED EMBODIMENTS

Figure 1:
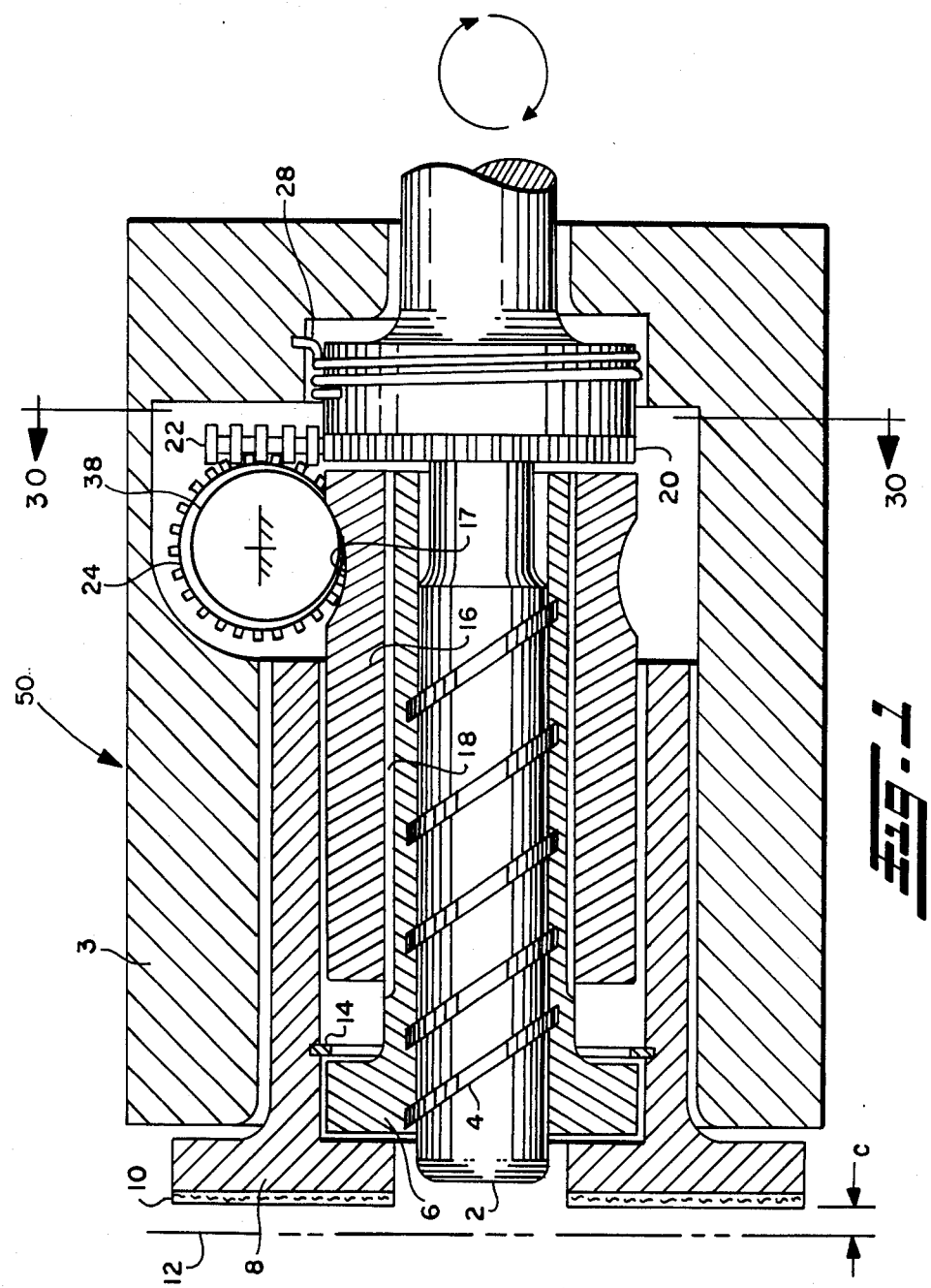
FIG. 1 shows a partially cross-sectional side elevation view of a preferred embodiment of the slack adjuster of the invention.

FIG. 1 shows a preferred embodiment of the invention in the form of slack adjuster 50. Adjuster 50 is used in a brake assembly that includes an elongate power screw 2 that is mounted for rotation within housing 3. Screw 2 is caused to rotate in opposite directions upon respective actuation by respective application and release of the brake by the operator as shown by the arrows. The means by which power screw 2 is actuated may be any suitable hydraulic and/or mechanical mechanism and is thus not shown in the Figures. Power screw 2 is provided with helical threads 4 which are threadingly engaged with threads of nut member 6 which is disposed coaxially about power screw 2 as shown in FIG. 1. Nut member 6 is caused to move in opposite axial directions along power screw 2 in response to its rotation in respective opposite directions. In FIG. 1, nut member 6 is caused to move towards the viewer's left when power screw 2 is rotating clockwise when viewed from the right end thereof and in an opposite axial direction when power screw 2 is rotating counter-clockwise.

Braking member 8 is disposed coaxially about power screw 2 and nut member 6 as shown in FIG. 1. Braking member 8 includes a layer 10 of suitable frictional braking material secured thereto. Application of the brake by an operator causes power screw 2 to rotate clockwise which in turn causes nut member 6 to move towards the viewer's left and press against braking member 8 and correspondly urge braking member 8 in a brake applying direction towards and against rotatable braking surface 12 which is commonly a wheel disc of a motor vehicle. Although other means of rotating power screw 2 in an opposite direction upon release of the brake by the operator may be used, such is preferably accomplished by biasing means preferably in the form of torsion spring 28 having one end secured to power screw 2 and an opposite end to housing 3. Torsion spring 28 is mounted and adapted such that it tightens upon clockwise rotation of power screw 2 upon application of the brake by the operator and stores sufficient energy to rotate or assist in rotation of power screw 2 in a counter-clockwise direction upon release of the brake by the operator. Counter-clockwise rotation of power screw 2 causes nut member 6 to press against stop ring 14 secured to braking member 8 and accordingly move braking member 8 in a brake releasing direction toward the viewer's right. Thus, opposite axial movement of nut member 6 in response to opposite directional rotation of power screw 2 causes braking member 8 to correspondly move in opposite brake applying and brake releasing directions. Although shown in one form in FIG. 1, it is to be understood that braking member 8 may be of any configuration that is caused to move in opposite brake applying and brake releasing directions upon respective application and release of the brake by the operator either respectively directly towards and away from braking surface 12 or indirectly by means of any intermediate components desired to be interposed therebetween as is well known to those skilled in the art. For example, braking member 2 may be used to rotate an "S" cam in corresponding opposite rotational directions which in turn causes a brake shoe to correspondly move towards and away from a conventional vehicular brake drum.

Repeated use of the brakes causes layer 10 of frictional material to wear which in turn will necessitate that braking member 8 be moved greater and greater distances in the brake applying direction in order to apply the brakes. In FIG. 1, clearance "C" denotes an initial clearance desired between layer 10 of braking member 8 and rotatable braking surface 12 in a brake released condition. The automatic slack adjuster of the invention by which one is able to automatically maintain a substantially constant clearance "C" in a brake released condition in order to overcome wear of layer 10 is hereinafter described.

Slack adjuster 50 includes an adjustment member 16 that is disposed coaxially about nut member 6. Adjustment member 16 is restricted against axial movement with respect to nut member 6 and is engaged therewith by engagement means preferably in splined engaged relationship therewith in the form of splines 18 which enable nut member 6 to slide in opposite axial directions with respect thereto upon application and release of the brake by the operator as previously described in addition to rotating nut member 6 at least in a direction causing braking member 8 to move in a brake applying direction in response to rotation thereof in a direction causing such movement which, in the case of adjuster 50, is a clockwise direction when viewed from the right end of power screw 2 as previously described.

The means by which adjustment member 16 is rotated upon application of the brake by the operator is hereinafter described.

Power screw 2 is operable to drive first driving means preferably in the form of gear means 20 in opposite directions corresponding to opposite directional rotation of power screw 2. Although gear 20 may be separately rotatably mounted and driven by power screw 2, gear 20 is preferably an integral part of power screw 2 as shown in FIGS. 1 and 2.

Figure 2:
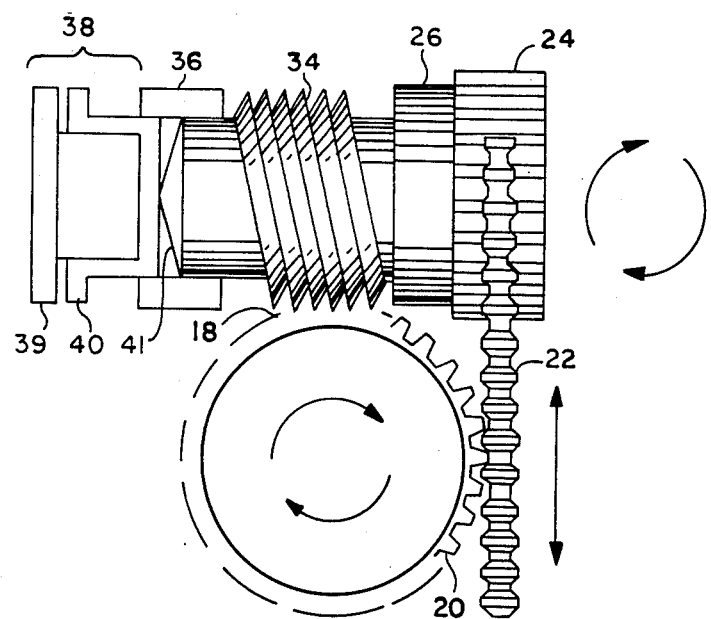
FIG. 2 shows a view 30—30 of the slack adjuster of FIG. 1.

As shown in FIGS. 1 and 2, gear 20 is operably engaged with rack means 22. Rack means 22 is mounted for movement such that is driven in opposite directions as shown by the arrows in FIG. 2 in response to opposite directional rotation of gear 20. Rack means 22 is operably engaged with second driving means preferably in the form of gear 24 and is operable to rotate gear 24 in opposite rotational directions in response to the opposite movement of rack means 22.

As shown in FIG. 2, gear 24 is operably engaged with third driving means preferably in the form of worm wheel 34 which is mounted for rotation such as by support 36 and driven in opposite rotational directions by correspondly opposite directional rotation of gear 24.

Adjustment member 16 is provided with driving means for driving it in opposite rotational directions preferably in the form of a worm gear 17 disposed in its outer surface as shown in FIG. 2. Thus, worm wheel 34 is operably engaged with worm gear 17 of adjustment member 16 as well as with gear 24 and is operable to drive adjustment member 16 in opposite rotational directions corresponding to opposite rotational movement of gear 24 which in turn is driven by respective opposite directional movement of rack means 22 which in turn is driven by gear 20 as previously described.

Worm wheel 34 is adapted to rotate adjustment member 16 in a clockwise direction upon application of the brake by an operator when viewed from the right end of power screw 2. Clockwise rotation of adjustment member 16 causes nut member 6 to correspondly rotate in a clockwise direction and advance axially along power screw 2 towards the viewer's left and accordingly move braking member 8 a predetermined distance towards braking surface 12. The clearance correcting distance by which braking member 8 is caused to move by rotation of adjustment member 16 is readily controlled by proper selection of the characteristics of the first, second and third driving means, the adjustment member driving means and rack means such as by selection of the pitch diameter and number of teeth of gear 20, gear 24, the rack teeth and the threads of worm wheel 34 and worm gear 17.

Although the particular drive train described herein for enabling rotation of power screw 2 to rotate adjustment member 16 in a clearance correcting direction upon application of the brake by an operator is preferred, it is to be understood that any suitable gear train operative to provide the same result is within the scope of this invention.

In addition to the drive train previously described, the adjuster of the invention includes means for preventing adjustment nut 16 from backing off by rotating in a counter-clockwise direction upon release of the brake by the operator as well as means for preventing further rotation of adjustment member 16 upon engagement between the braking member and the rotatable braking surface.

The latter is provided by including clutch means operable to rotate in a direction to enable the drive train to operate as previously described upon application of the brake by the operator and to slip in an opposite rotational direction and to further slip to prevent further clockwise rotation of adjustment member 16 once braking member 8 becomes engaged with braking surface 12. The clutch means is preferably in the form of clutch 26 shown in FIG. 2 that is preferably disposed intermediate the second driving means (gear 24) and the third driving means (worm wheel 34) to provide the operable engagement therebetween. Clutch 26 is adapted to transmit rotational torque from gear 24 to worm wheel 34 and rotate worm wheel 34 counter-clockwise as previously described but to slip in a clockwise rotational direction as well as to slip and thus prevent further clockwise rotation of adjustment nut 16 upon engagement between braking member 8 and braking surface 12. Although preferably in the position shown in FIG. 2, the clutch means may be disposed at any point in the driving train provided that it provides the slippage function described.

The slack adjuster is further provided with rotational direction control means for preventing adjustment member 16 from backing off in a counter-clockwise rotational direction upon release of the brake by the operator. Such directional control means is preferably provided in the form of a one-way ratchet assembly 38 which is preferably operably engaged with the third driving means (worm wheel 34) as shown in FIG. 2. Assembly 38 comprises a ratchet stator 39 that is secured against movement and a ratchet rotor 40 that is urged against stator 39 by ratchet spring 41 disposed between worm wheel 34 and rotor 40. The ratchet innerface between stator 39 and rotate 40 is adapted to enable worm wheel 34 to rotate only in the counter-clockwise direction and prevent it from rotating in a clockwise direction when the brake is released by the operator. The stationary condition of worm wheel 34 upon release of the brake by the operator is prevented from being transferred back through clutch 26 to gear 24 by the previously described ability of clutch 26 to slip when rotated in a clockwise direction thus enabling gear 24 to rotate clockwise and cause rack means 22 to move in a direction commensurate with counter-clockwise rotation of gear 20 without damage and without affecting the clearance corrected position of nut member 6 achieved by application of the brake by the operator.

Thus, the slack adjuster of the invention is operative to automatically advance a braking member upon application of the brake by an operator a clearance correcting distance sufficient to insure that a desired clearance is maintained between the braking member and braking surface upon release of the brake by the operator since, once the brake pedal is released, return spring 28 is operable to rotate power screw 2 in an opposite direction which in turn causes member 6 to engage stop 14 and move braking member 8 away from braking surface 12 which is enabled by nut member 6 being able to slide the correcting axial distance along the splined engagement 18 between nut member 6 and adjustment member 16 which is held against rotating in an opposite direction by directional control means 38.

What is claimed is:

1. An automatic slack adjuster for maintaining a substantially constant clearance between a braking member and a rotatable braking surface in a brake released condition of a brake assembly of the type including an elongate power screw mounted for rotation and having threads threadingly engaged with threads of a rotatable nut member disposed coaxially thereabout and operative to move in opposite axial directions along the power screw and cause the braking member to correspondly move in opposite brake applying and brake releasing directions in response to corresponding rotation of the power screw in opposite directions upon actuation thereof by application and release of the brake by an operator, said adjuster comprising:

an adjustment member disposed coaxially about the nut member and secured against axial movement with respect thereto, said adjustment member provided with driving means enabling the adjustment member to be driven in opposite rotational directions about the power screw and in engaged relationship with the nut member by means enabling the nut member to move in said opposite axial directions with respect to both the power screw and the adjustment member upon application and release of the brake by the operator and to rotate the nut member at least in a direction causing the nut member to advance axially along the power screw in a direction causing the braking member to move towards the braking surface upon application of the brake by the operator, drive train means driven by said power screw and operative to drive said adjustment member in said opposite rotational directions, clutch means cooperating with said drive train means and operative to prevent said adjustment member from continuing to rotate upon engagement between the braking member and the braking surface, and rotational direction control means, said control means cooperating with said drive train means and operative to limit rotation of said adjustment member only in a direction enabling said nut member to move said braking member towards said braking surface.

2. The adjuster of claim 1 wherein said drive train means comprises:

first drive means driven in opposite rotational directions by said power screw, rack means operatively engaged with said first drive means and driven thereby in opposite directions in response to rotation of the first driving means in said opposite directions, second drive means operatively engaged with said rack means and driven thereby in opposite rotational directions in response to movement of said rack means in said opposite directions, third drive means operatively engaged with said second drive means and with said adjustment member drive means and operative to be driven by the second driving means and to drive the adjustment member in said opposite rotational directions upon respective application and release of the brake by the operator.

3. The adjuster of claim 2 wherein said first driving means is a gear formed as an integral part of said power screw.

4. The adjuster of claim 2 wherein said third drive means is a worm wheel and said adjustment member drive means is a worm gear integral therewith and threadingly engaged with said worm wheel.

5. The adjuster of claim 1 wherein said engaged relationship between the adjustment member and the nut member comprises a splined engaged relationship therebetween adapted to enable the nut member to slide axially in opposite directions with respect to the adjustment member upon application and release of the brake by the operator.

6. The adjuster of claim 1 wherein the rotational direction control means is operatively engaged with said third drive means.

7. The adjuster of claim 1 wherein the rotational direction control means is a one-way ratchet assembly.

8. The adjuster of claim 1 including biasing means adapted upon release of the brake by the operator to rotate the power screw in a direction opposite to the rotational direction thereof caused by application of the brake by the operator.

9. The adjuster of claim 8 wherein the biasing means is a torsion spring having one end secured to a fixed housing and an opposite end secured to the power screw.

10. The adjuster of claim 1 wherein the clutch means is disposed intermediate said second and third drive means and provides the operative engagement therebetween.

* * * * *